April 18, 1950   C. I. HALL   2,504,681
ELECTROMAGNETIC DEVICE
Filed April 27, 1948
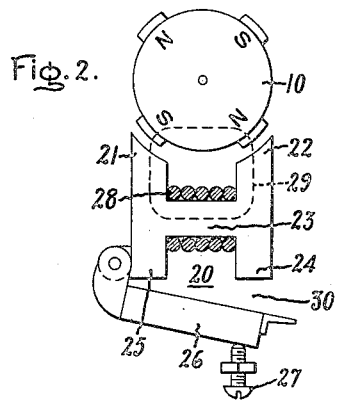
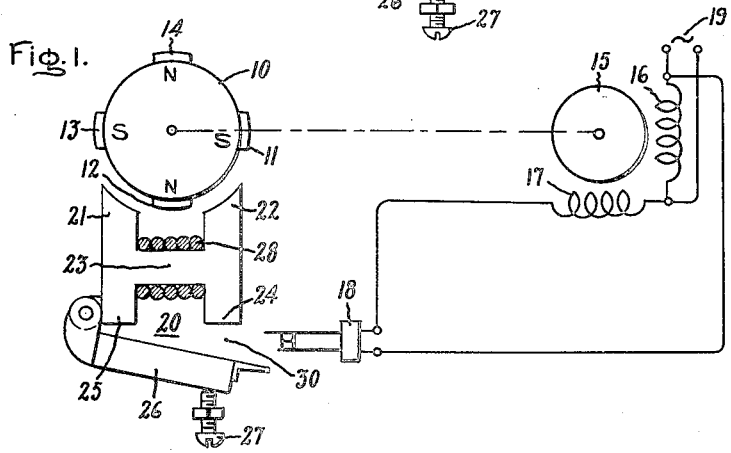
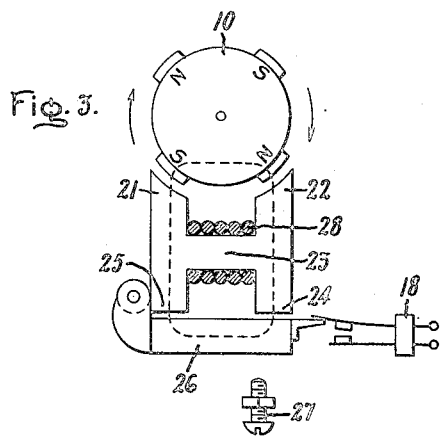
Inventor:
Chester I. Hall,
by Claude A. Mott
His Attorney.

Patented Apr. 18, 1950

2,504,681

UNITED STATES PATENT OFFICE 2,504,681

ELECTROMAGNETIC DEVICE

Chester I. Hall, Schenectady, N. Y., assignor to General Electric Company, a corporation of New York Application April 27, 1948, Serial No. 23,522

8 Claims. (Cl. 171—252)

My invention relates to electromagnetic apparatus for operating switches, relays and other contact making devices, and is more particularly directed to the utilization thereof in connection with starting of single phase electric motors or as a speed limiting device although it is by no means limited to these particular uses.

The main object of my invention is to provide a new and improved device which is simple and inexpensive to construct.

Another object is to provide a device which is extremely positive in action and reliable in operation.

Another object is to provide a device which acts positively at predetermined speeds and has a wide range of application.

In general, my invention comprises a rotatable multi-pole permanent magnet adapted for rotation, for example, by a single phase electric motor having start and run windings. Associated with the magnet is a magnetic core structure of generally H-shaped configuration having two of its upper arms so disposed that same are alternately adjacent the poles of the permanent magnet, the gap between the magnet poles and the core arms being of the order of 15 mils. The cross bar of the core normally forms a very low reluctance path for the magnetic flux in the stationary or slow speed condition of the electric motor. A low resistance short-circuited coil is mounted on this cross bar. A parallel magnetic path is provided through an armature adjacent the lower arms and is normally one of higher reluctance due to a relatively larger air gap between said armature and one of the lower arms of the core.

Increasing the speed of the electric motor causes the frequency and energy in the short-circuited coil to increase due to the changing magnetic field of the rotating permanent magnet. This results in a proportional increase in reluctance of the cross arm associated with the coil and a larger proportion of the flux is forced through the air gap between the armature and lower arm so as to cause said armature to close said gap. The movement of the armature is utilized to operate a switch in series with the start winding thereby to disable said winding when the electric motor comes up to a predetermined speed.

My invention will be best understood by reference to the following description and accompanying drawing in which, by way of illustration, Fig. 1 is an embodiment of my invention as practiced in connection with a single phase motor having start and run windings; and Figs. 2 and 3 illustrate the flux path under different operating conditions of my invention.

Referring to Fig. 1, I provide a rotatable permanent magnet member 10, having a plurality of pole faces 11—14 in equi-distant spaced and alternate polar relation. While my device illustrates the utilization of a four-pole magnet my invention is adapted to utilize other polar arrangements.

The member 10 is adapted to be rotated, for example, by a single phase motor 15 having run and start windings 16—17, the start winding 17 being connected in series with a normally closed switch 18 and a current supply circuit 19.

Means for actuating the switch 18 is provided by a magnetic structure 20 comprising a generally H-shaped core member having a pair of upper arms, or salient polar portions, 21—22, a cross bar 23 and a pair of lower arms 24—25. An armature 26, movable in response to a sufficient amount of magnetism, is hinged to the lower arm 25, the force of gravity, in this particular embodiment, causing the armature, in the absence of sufficient magnetic force, to come to rest against an adjustable stop member 27. Under suitable conditions, as will be explained, the armature when properly influenced will actuate the switch 18.

Means for increasing the reluctance in the magnetic path of the cross bar 23 is provided by a short-circuited winding 28 surrounding same. How this arrangement serves to increase the reluctance to the presence of flux in the cross bar 23 will be presently explained.

In Fig. 2, I illustrate a path 29 assumed by the lines of force or the flux which defines a magnetic circuit through a portion of the permanent magnet 10, the arms 21—22 and the cross arm 23. Such a path presents a relatively lower reluctance as compared to the parallel path which includes the lower arms 24—25, the armature 26 and the air-gap 30. This condition prevails when the member 20 is stationary or moving at a very slow speed, for example, of the order of three revolutions per minute so that the flux divides into two parallel paths, inversely in proportion to the reluctances of the two parallel magnetic circuits.

Under the above conditions the flux available between the arm 24 and the armature 26 is extremely small. As the speed of the motor 15 is increased, the reversing magnetic field or flux in the arms 21 and 22 changes more rapidly and the frequency and available energy in the short-circuited coil 28 increases. This results in a proportional increase in reluctance of the cross arm 23, so that a larger and larger proportion of the available flux of the member 10 forces itself through the gap 30 as shown in Fig. 3. It is also believed that the flux produced by the counter electromotive force of the coil 28 is fed back into the two parallel magnetic circuits, one of which includes the air gap and the other the magnet 20. Since the magnet is of very low permeability this path is extremely high in reluctance so that the greater portion of the flux produced by the short-circuit coil is passed through the air gap circuit 30 and thereby aids the pull at this point.

By proper adjustment of the air gap, I obtain closure of the armature 26 at any predetermined speed of, for example, the motor 15. Closure of the armature will open the normally closed switch 18 and disable the start winding 17 and so permit the motor 15 to run as an induction motor on the run winding 16 only.

Upon de-energization of the current circuit 19, the motor will slow down. However, due to the fact that the armature 26 has closed the gap 30 and is now in intimate contact with the projection 24, the energy required from the magnet 10 is relatively small. As a result the armature 26 will be retained in this last-mentioned position (see Fig. 3) down to a comparatively low speed of the motor so that the contacts of the switch 18 will not reclose until the motor has reached a speed of a few revolutions per minute.

The above feature of my invention meets one of the requirements in the operation of capacitor start motors. If the start winding in such a motor should be energized while the motor is turning at a comparatively high speed, the run and start windings will be connected in parallel with the capacitor and a very heavy dynamic braking will result which is extremely undesirable. This is entirely eliminated since at low speed such braking is ineffectual.

The release of the armature 26 is absolutely certain in spite of the fact that the magnetic circuit is tightly sealed. As the motor slows down, the armature 26 will be subjected to a de-magnetizing effect by a constantly decreasing alternating current field of lower and lower frequency. Since this field is passing through zero and the zero points become far enough apart (low frequency), the armature will drop out.

While I have illustrated and described the utilization of a four pole magnet which provides a ninety degree position of the north and south poles, the use, for example, of a six pole magnet will permit the north and south poles to have diametrically disposed positions thereby to permit a different arrangement of the core structure.

An important feature of my invention, when utilized in connection with electric motors, is that the normal end shake of the motor rotor or shaft and its bearings cannot interfere with the calibration and operation as it would, for example, in a centrifugal type of switch. The motion along the shaft of the motor merely results in the shifting of the magnet member 10 with relation to the fixed poles 21—22.

The embodiment of my invention which I have described and illustrate was selected for the purpose of setting forth the principles involved. It will be obvious that the invention may be modified to meet various conditions for different specific uses and it is, therefore, intended to cover by the appended claims all such modifications which fall within the spirit and scope of my invention.

What I claim as new and desire to secure by Letters Patent of the United States is:

1. In an electromagnetically actuated device, a magnetizable core having spaced apart polar portions, a rotatable magnetic member juxtaposed with respect to said polar portions to provide upon rotation thereof a reversing magnetic flux in said core having a frequency of reversal proportional to the speed of rotation of said member, said core providing between said polar portions two parallel flux paths one of which is of relatively lower reluctance than the other at low frequencies of flux reversal, means associated with said one magnetic path for increasing its reluctance at high frequencies of flux reversal, a movable armature associated with said other flux path, said armature being biased normally to provide an air gap in said other path, and means utilizing the movement of said armature.

2. In an electromagnetically actuated device, a magnetizable core having spaced apart polar portions, a rotatable magnetic member juxtaposed with respect to said polar portions to provide upon rotation thereof a reversing magnetic flux in said core having a frequency of reversal proportional to the speed of rotation of said member, said core providing between said polar portions two parallel flux paths one of which is of lower reluctance than the other at low frequencies of flux reversal, means associated with said one flux path for increasing the relative reluctance thereof at higher frequencies of flux reversal thereby to shunt a greater proportion of flux through said other flux path, and a movable armature associated with said last-named path.

3. In an electromagnetically actuated device, a magnetizable core having spaced apart polar portions, a rotatable magnetic member juxtaposed with respect to said polar portions to provide upon rotation thereof a reversing magnetic flux in said core having a frequency of reversal proportional to the speed of rotation of said member, said core providing between said polar portions two parallel flux paths one of which is of relatively lower reluctance than the other at low frequencies of flux reversal, a short circuited coil associated with said first-named path for increasing the reluctance thereof as the frequency of flux reversal increases thereby to direct a greater proportion of total flux through the other flux path, a movable armature associated with said other flux path and arranged to be actuated upon a predetermined flux density therein, and means utilizing the movement of said armature.

4. In an electromagnetically actuated device, an H-shaped magnetizable core having spaced-apart side arms and a cross arm defining a first magnetic flux path therebetween, a movable armature hinged to one of said side arms and movable toward and away from the other side arm thereby to provide a second magnetic flux path parallel to said first flux path, a rotatable magnet disposed adjacent said core to provide upon rotation thereof a magnetic flux through said parallel flux paths, means associated with said cross arm for increasing the reluctance of the path therethrough as the frequency of flux reversal increases, thereby to shunt a greater proportion of the total flux through said armature and effect movement thereof, and means utilizing the movement of said armature.

5. In an electromagnetically actuated device, an H-shaped magnetizable core having side arms in substantially parallel spaced relation and a cross arm intermediate its ends, said cross arms defining a first magnetic flux path between said side arms, an armature hinged at one end of said side arms and movable toward and away from the proximate end of the other side arm, means biasing said armature to a position spaced from said proximate end, said armature providing a second flux path parallel to said first path and including an air gap, a short circuited coil surrounding said cross arm, and a rotatable magnet having poles cooperating with the opposite ends of said side arms to provide through said flux paths a reversing magnetic field having a frequency of reversal proportional to the speed of rotation of said magnet.

6. A speed responsive device comprising a pair of relatively rotatable magnetizable members, one of said members being magnetized to provide a pair of angularly displaced magnetic poles, the other said member providing a pair of cooperating salient poles and a pair of parallel flux paths therebetween, one said flux path including a movable armature biased to provide an air gap in said path, and a short circuited electric conducting coil surrounding at least a portion of said other flux path.

7. A speed responsive device comprising a rotatable magnet having a pair of opposite poles angularly spaced apart, a stationary core member providing a pair of cooperating salient poles and a pair of parallel flux paths therebetween, one of said flux paths including a movable armature biased to provide an air gap in said path, and a short circuited electric conducting coil surrounding at least a portion of said other flux path.

8. In a speed responsive device, a magnetizable core providing a pair of spaced apart pole faces and a pair of parallel flux paths therebetween, one of said flux paths including a movable armature, a short circuited winding on said core surrounding at least a portion of the other flux path, means for establishing a magnetic flux through said paths, and a rotatable member arranged to vary periodically the total flux density through said path at a frequency proportional to the speed of rotation.

CHESTER I. HALL.

REFERENCES CITED

The following references are of record in the file of this patent:

UNITED STATES PATENTS

| Number | Name | Date |
| --- | --- | --- |
| 1,979,127 | Warrick | Oct. 30, 1934 |